March 19, 1935.  G. H. LAMBORN  1,994,479
METHOD OF WELDING ALLOY STEELS
Filed March 27, 1931
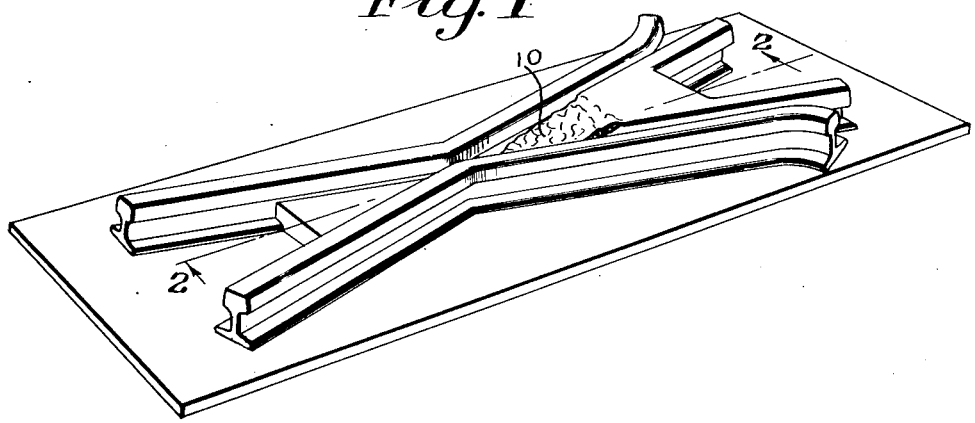
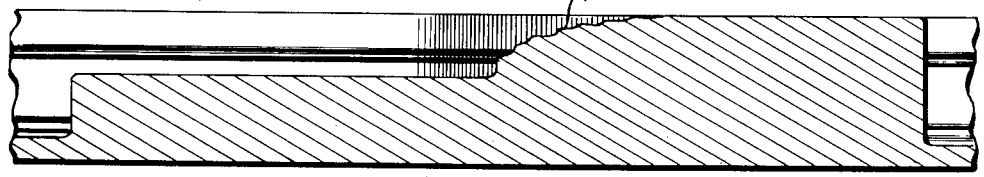
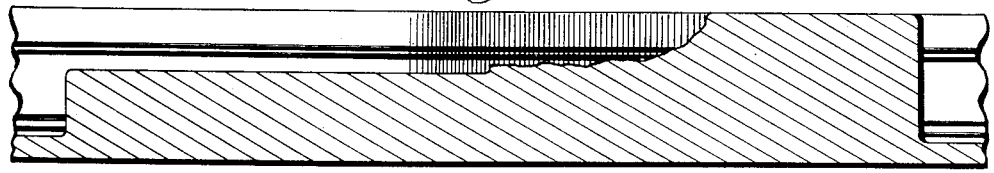
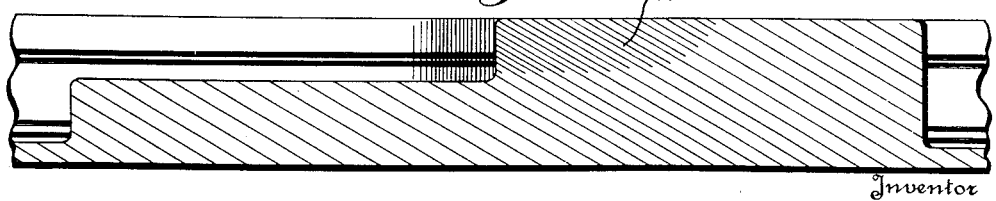
Inventor
George H. Lamborn
By Bean, Brooks & Henry.
Attorney Patented Mar. 19, 1935

1,994,479

UNITED STATES PATENT OFFICE 1,994,479

METHOD OF WELDING ALLOY STEELS

George H. Lamborn, Chicago, Ill., assignor to Morrison Railway Supply Corporation, Buffalo, N. Y.

Application March 27, 1931, Serial No. 525,819

9 Claims. (Cl. 219—10)

The present invention relates to a method of arc welding and more particularly to a method of welding ferrous alloys of special composition.

It has been the practice heretofore to subject ferrous alloys of normal composition, that is to say, iron or steel containing carbon, sulfur, and phosphorus, in addition to the iron, to a process of arc welding wherein a welding rod of such composition as to duplicate substantially the composition of the work piece was used in the process.

In the usual methods of welding, the material to be welded, the work piece, has an electrical contact of a given potential. A welding rod, usually an ordinary carbon steel rod, is connected to an electrical source having a potential opposite in sign to that of the work piece, and an arc is struck between the welding rod and the work piece and relative movement produced between the rod and the piece so that the metal of the rod is melted and deposits upon portions of the piece, such as raw edges which may be juxtaposed, forming a tight joint therebetween and producing an integral unit from those portions.

Extreme difficulty has been encountered in welding certain ferrous alloys of special composition. It has been experienced in the welding of such alloys that great difficulty has been encountered in the production of welds which were free from checks and cracks and which were coherent and which adhered tenaciously to the work piece.

The present invention may be used for the production of welds upon manganese steels which have heretofore not lent themselves to welding treatments, whereby a weld is produced which possesses the properties of hardness, toughness, and resistance to wear, which was possessed by the original casting.

This method of welding may also be used for building up worn portions of manganese steels which have been subjected to particularly hard wear and attrition and which have lost their original shape and size, or which are cracked and shattered, and which require additions of metal thereto so that the original contour and continuous surface of the piece may be restored.

In the practice of my invention in building up worn and broken portions of manganese steels as adapted to the restoration of railway frogs or crossings, Fig. 1 is a representation of a worn frog prior to the welding treatment, showing the worn and shattered point at 10, Fig. 2 is a section on line 2—2 of Fig. 1, and in an enlarged scale, Fig. 3 is a representation of the frog in section after receiving preliminary treatment prior to adding the welding material thereto, and Fig. 4 is a representation of a finished welded crossing also in section, wherein the built-up portion is indicated by heavier shading at 11.

In the reconstruction of castings or shapes of alloy material, for instance, a railway frog or crossing, the worn work piece, such as the frog illustrated in Fig. 1, or other casting which it is desired to rebuild and regenerate for additional service, is subjected to a preliminary operation whereby any portion of the cast alloys adjacent the worn surfaces is removed from the castings, such as by a grinding or chipping method, so that a free surface of virgin and unworn metal is presented upon which the reconstruction may be placed.

This operation is shown graphically in Fig. 2 wherein is depicted the railway frog having the worn portions chipped away and a fresh surface presented upon which work may be carried out.

The next step of my invention comprises the reconstruction or welding steps proper. The work piece or the material to be welded is connected in some convenient way to a source of electric current by any means which are generally used and well-known in the art, while a second connection carrying an opposite electrical potential is connected to a welding rod having an austenitic structure and containing nickel, and an arc struck between the work piece and the rod. This connection is made in such fashion that in general the welding rod is caused to melt and the molten metal drops upon the work piece whereby the same is built up and gradually reconstructed to conform to the original shape and outline of the casting or piece.

In the general and usual method of operation, the very hot rod melts away and deposits molten metal upon the work piece which is heated locally without general fusion. I have found it to be good practice to prepare the work piece prior to deposition of the rods by preheating the work piece to a temperature somewhat below a red heat.

After deposition of a portion of the rod upon the work piece, I have found that a structure may be produced in which the reconstructed portion is a tough, hard and resistant coherent mass of metal which will not chip nor crack if it has been subjected to impact pressure while still at a temperature above red heat. I believe that a hammering, peening or impact operation immediately after deposition of metal equivalent to about one-half the rod produces a more completely adherent mass deposited upon the work piece which tends to prevent the formation of small checks and cracks which are prone to form when the deposited metal has not been subjected to a hammering operation.

Further additions of the welding rod are made to the work piece and these deposited portions are in turn subjected to a hammering operation until sufficient metal has been added to the piece to make it conform to the original size and shape.

I have found that in rebuilding castings of certain compositions, notably manganese steel castings, or castings which are subjected to unusual impact and attrition, such as those used for railway frogs and crossings and which contain in the neighborhood of 14% manganese in addition to the usual alloying elements, present in ferrous alloys, as sulfur and phosphorus, special composition welding rods are necessary. When ordinary carbon welding rods are used to rebuild manganese steel castings, the rebuilt portion of the casting does not possess the same hardness, toughness or resistance to wear as the original body of the casting, and since it is the rebuilt portion which will be again subjected to the greatest wear, this method of rebuilding and welding is not at all advantageous.

The welding rods which I have found suitable for use in rebuilding castings of special composition such as those mentioned above, are alloy steel containing nickel and which give an austenitic structure when cooled. I have also found that it is not essential in this connection to use a welding rod having the same composition as the work piece itself, but a good weld may be obtained by the use of rods of other compositions. I may mention in particular that a rod containing chromium and nickel, in addition to the iron, sulfur and phosphorus and carbon, is particularly efficacious for forming tough, hard and resistant rebuilt castings. The type of rod contains a fairly high percentage of chromium, for instance from 16% to 18%, and a substantial quantity of nickel, as for instance, 6% to 10%, although steel rods containing upwards of 35% nickel have been found to give a good weld since they give an austenitic structure.

Such a rod when used according to the method outlined above, produces exceptional results and good welds have been produced from a rod coated with various fluxing materials, such as sodium silicate, calcium fluoride, aluminum oxide, etc., which act as slagging materials for metallic oxides such as iron and which apparently protect the surface of the work piece and the welded portion from superficial oxidation which might tend to occur at the temperature reached.

It will be seen, therefore, that the present invention is to provide a method for rebuilding, reconstructing and welding special composition ferrous alloys by the use of welding rods which may possess a special chemical composition capable of producing a hard, tough, coherent and resistant welded portion which does not check nor crack readily and which presents a surface possessing a hardness and toughness, either comparable to or better than that of the original piece.

What I claim is:—

1. The process of welding a work piece of manganese steel which comprises depositing a metal from a steel welding rod having an austenitic structure and containing about 16% to 18% chromium and 6% to 35% nickel upon said piece by connecting the piece and the rod to opposite terminals of an electric circuit, striking an arc between said piece and said rod for depositing metal upon said piece, maintaining the deposited metal at a temperature above a dull red heat, and substantially immediately after deposition subjecting the deposited metal while still at a dull red heat to impact to prevent formation of checks and cracks.

2. The process of welding a work piece of manganese steel which comprises depositing a metal from a steel welding rod having an austenitic structure and containing nickel upon said piece by connecting the piece and the rod to opposite terminals of an electric circuit, striking an arc between said piece and said rod for depositing metal upon said piece, maintaining the deposited metal at a temperature above a dull red heat, and substantially immediately after deposition subjecting the deposited metal while still at a dull red heat to impact to prevent formation of checks and cracks.

3. The process of rebuilding a worn work piece of manganese steel which comprises removing the checked portion of the piece to expose unaltered steel and thereafter depositing metal upon the unaltered steel from a steel welding rod having an austenitic structure and containing nickel by connecting the piece and rod to opposite terminals of an electric circuit, striking an arc between said piece and said rod to deposit metal upon the piece, discontinuing the deposition of metal before the layered metal has cooled below a dull red heat and substantially immediately after deposition subjecting the deposited metal while still at a dull red heat to impact to prevent formation of checks and cracks.

4. The process of welding a work piece of manganese steel which comprises depositing a metal from a steel welding rod having an austenitic structure and containing nickel and chromium upon said piece by connecting the piece and the rod to opposite terminals of an electric circuit, striking an arc between said piece and said rod for depositing metal upon said piece, maintaining the deposited metal at a temperature above a dull red heat and substantially immediately after deposition subjecting the deposited metal while still at a dull red heat to impact to prevent formation of checks and cracks.

5. The process of welding a work piece of manganese steel which comprises preheating the section to be welded, depositing upon said preheated section a metal from a steel welding rod having an austenitic structure and containing nickel by connecting the piece and the rod to opposite terminals of an electric circuit, striking an arc between said piece and said rod for depositing metal upon said piece, maintaining the deposited metal at a temperature above a dull red heat and substantially immediately after deposition subjecting the deposited metal while still at a dull red heat to impact to prevent the formation of checks and cracks therein.

6. The process of welding a work piece of manganese steel which comprises depositing a metal from a steel welding rod having an austenitic structure and containing nickel upon said piece by connecting the piece and the rod to opposite terminals of an electric circuit and striking an arc between said piece and said rod for depositing metal upon said piece, the amount of the metal deposited being less than required to complete the weld, maintaining the deposited metal at a temperature above a dull red heat while subjecting the deposited metal to impact to prevent formation of checks and cracks, and repeating the succession of steps of depositing metal and peening the deposit while at a dull red heat until the required amount of metal has been deposited.

7. The process of rebuilding a worn work piece of manganese steel which comprises removing the checked portion of the piece to expose unaltered steel, and thereafter depositing metal upon the unaltered steel from a steel welding rod having an austenitic structure and containing nickel and chromium upon said piece by connecting the piece and the rod to opposite terminals of an electric circuit, striking an arc between said piece and said rod for depositing metal upon said piece, maintaining the deposited metal at a temperature above a dull red heat and substantially immediately after deposition subjecting the deposited metal while still at a dull red heat to impact to prevent formation of checks and cracks.

8. The process of rebuilding a worn work piece of manganese steel which comprises removing the checked portion of the piece to expose unaltered steel, and thereafter depositing metal upon the unaltered steel from a steel welding rod having an austenitic structure and containing nickel upon said piece by connecting the piece and the rod to opposite terminals of an electric circuit and striking an arc between said piece and said rod for depositing metal upon said piece, the amount of the metal deposited being less than required to complete the weld, maintaining the deposited metal at a temperature above a dull red heat while subjecting the deposited metal to impact to prevent formation of checks and cracks, and repeating the succession of steps of depositing metal and peening the deposit while at a dull red heat until the required amount of metal has been deposited.

9. The process of rebuilding a worn work piece of manganese steel which comprises removing the checked portion of the piece to expose unaltered steel, preheating the section to be welded, depositing upon said preheated section a metal from a steel welding rod having austenitic structure and containing nickel by connecting the piece and the rod to opposite terminals of an electric circuit, striking an arc between said piece and said rod for depositing metal upon said piece, maintaining the deposited metal at a temperature above a dull red heat and substantially immediately after deposition subjecting the deposited metal while still at a dull red heat to impact to prevent the formation of checks and cracks therein.

GEORGE H. LAMBORN.